(12) United States Patent
Libakken

(10) Patent No.: US 12,214,619 B2
(45) Date of Patent: Feb. 4, 2025

(54) ROLLER DEVICE WITH ECCENTRIC WHEEL AXLE

(71) Applicant: WHEEL.ME AS, Oslo (NO)

(72) Inventor: Rolf Libakken, Båtsfjord (NO)

(73) Assignee: WHEEL.ME AS, Oslo (NO)

( * ) Notice: Subject to any disclaimer, the term of this patent is extended or adjusted under 35 U.S.C. 154(b) by 490 days.

(21) Appl. No.: 17/621,794

(22) PCT Filed: Jun. 25, 2020

(86) PCT No.: PCT/EP2020/067975
§ 371 (c)(1),
(2) Date: Dec. 22, 2021

(87) PCT Pub. No.: WO2020/260552
PCT Pub. Date: Dec. 30, 2020

(65) Prior Publication Data
US 2022/0410622 A1   Dec. 29, 2022

(30) Foreign Application Priority Data

Jun. 27, 2019   (NO) .................................... 20190805

(51) Int. Cl.
*B60B 27/00*   (2006.01)
*B60B 33/00*   (2006.01)

(52) U.S. Cl.
CPC ...... *B60B 27/0015* (2013.01); *B60B 33/0044* (2013.01); *B60B 33/0049* (2013.01); *B60B 33/0092* (2013.01); *B60B 2200/20* (2013.01)

(58) Field of Classification Search
CPC ............ B60B 27/0015; B60B 33/0044; B60B 33/0049; B60B 33/0063; B60B 33/0092;
(Continued)

(56) References Cited

U.S. PATENT DOCUMENTS

| | | | |
|---|---|---|---|
| 1,857,653 A | 5/1932 | Meyercord et al. | |
| 3,534,974 A | 10/1970 | Jerrard et al. | |

(Continued)

FOREIGN PATENT DOCUMENTS

| | | |
|---|---|---|
| EP | 3 260 618 | 12/2017 |
| EP | 3 355 148 | 8/2018 |

(Continued)

OTHER PUBLICATIONS

International Search Report issued Oct. 16, 2020 in International (PCT) Application No. PCT/EP2020/067975.

(Continued)

*Primary Examiner* — S. Joseph Morano
*Assistant Examiner* — Emily G. Castonguay
(74) *Attorney, Agent, or Firm* — Wenderoth, Lind & Ponack, L.L.P.

(57) ABSTRACT

A rolling device having a bearing housing accommodating a wheel axle,
 a drive motor with first and second motor parts for conduction of relative rotation between a wheel element and the wheel axle,
 end portions of the wheel axle being connected to axle support members in an eccentric position displaced from the center line of the axle support members, and locks
 operable between an unlocked position allowing rotation of the axle support members relative to the bearing housing, and a locking position preventing the rotation of the axle support members, wherein in the unlocked position, the motor conducts rotation of the axle support members and wheel axis for displacement of the wheel element by an eccentric movement between an extended position where at least a portion of the wheel element projects outside the bearing housing and a retracted position where the wheel element is located inside the bearing housing.

10 Claims, 3 Drawing Sheets

(58) Field of Classification Search
CPC ....... B60B 33/04; B60B 33/06; B60B 33/063; B60B 2200/20
See application file for complete search history.

(56) References Cited

U.S. PATENT DOCUMENTS

| | | | |
|---|---|---|---|
| 3,618,966 A | | 11/1971 | Vandervest |
| 3,685,851 A | | 8/1972 | Berry |
| 4,828,208 A | * | 5/1989 | Peterson ................ A47B 13/00 248/188.7 |
| 6,473,935 B1 | * | 11/2002 | Cherukuri ........... B60B 33/0049 16/33 |
| 2004/0181901 A1 | | 9/2004 | Magoto et al. |
| 2016/0339742 A1 | * | 11/2016 | Libakken ............ B60B 33/0092 |
| 2017/0056756 A1 | | 3/2017 | Pikulski |

FOREIGN PATENT DOCUMENTS

| | | |
|---|---|---|
| JP | 2007-90927 | 4/2007 |
| WO | 2015/118492 | 8/2015 |
| WO | 2017/094069 | 6/2017 |

OTHER PUBLICATIONS

Search Report issued Jan. 14, 2020 in Norwegian Application No. 20190805 with English translation.

* cited by examiner

ROLLER DEVICE WITH ECCENTRIC WHEEL AXLE

TECHNICAL FIELD

The present invention concerns a rolling device for mounting or integration into a device for enabling the movement of device along a surface.

More specifically the device to be moved may be a piece of furniture, interior building element such as a wall or a door. The device to be moved, may also be located out of doors for instance euro pallet or other devices that are cumbersome to move. The invention is suitable for moving all kind of devices that is to be moved between different locations both indoors and outdoors, where the movement is to occur along a surface, for instance a floor.

BACKGROUND

Various devices and especially furniture, are provided with wheels for facilitating the movement of devices from one location to another, for instance for regrouping devices or moving a device to get access to the space the device occupies or to the device itself.

The applicant has previously developed a rolling device capable of being integrated in devices, such as a piece of furniture, a movable wall etc., for moving the device along a surface, and which can be used by everyone regardless of physical condition and capacity to lift different devices in which the rolling device is integrated. This device is described in Norwegian Patent NO 316760 B 1.

The rolling device of NO 316760 B 1 comprises a cylindrical sleeve device for mounting in, for example, the leg of a piece of furniture, and a piston that is movably arranged in the cylindrical sleeve device. A ball-shaped or spherical wheel is arranged in the piston. The piston is movable, with the aid of a click system comprising a spring, between an upper position and a lower position. When the piston is in the lower position, the piece of furniture can be rolled across the floor it is standing on, whilst when the piston is in the upper position, the wheel is inside the cylindrical sleeve device and the leg of the piece of furniture, in which the rolling device is arranged, thus stands on the floor. The piece of furniture thus stands in the desired position without rolling inadvertently across the floor when small forces are applied to the piece of furniture. The solution is completely mechanical.

The applicant has further developed the concept and provided a rolling device with an automatic actuator system for moving a piston with a rolling element between an upper and lower position. This concept is disclosed in EP 3102429. The upper position is a passive stationary position where the wheel element is retracted in the rolling device, and the lower position is an active position for moving the rolling device along a surface. The actuator can be wirelessly controlled.

The present invention is a further development of the concept, providing an alternative solution for the arrangement of displacing the wheel element between a retracted position where the wheel element is prevented from moving along a surface and an extended position where the wheel element is prepared for movement along the surface.

The object of the present invention is therefore to provide a rolling device capable of being attached to or integrated in devices, and suggests an alternative to prior art solutions by providing a simple and reliable arrangement for moving the wheel element between a retracted and an extended position.

It has further been an object of the invention to find a solution that is simple to control and with a more compact construction than prior art solutions.

These and other characteristics of the invention will be clear from the following description of an exemplary embodiment, given as a non-restrictive example, with reference to the attached drawings.

SUMMARY OF THE INVENTION

The present invention relates to a rolling device for a device to enable the moving of the device along a surface. The rolling device may typically be configured for engagement with a device such as piece of furniture of various kind, an euro pallet or other devices where the moving is facilitated by the use of one or more rolling devices. The rolling device may be mounted to the device in various ways; by integration of the rolling device into a cavity in the device to be moved (for instance a part of the furniture), or by mounting the rolling device directly or indirectly to the device to be moved by the use of fixation means.

The rolling device comprises a bearing housing for accommodation of a wheel axle which carries a wheel element. The rolling device further comprises axle support members rotatably accommodated in the bearing housing. The wheel element may comprise various elements such as an ordinary wheel shape or may be have more of a ball shape or a spherical shape or any other shape capable of providing a rolling movement in interaction with a surface. The bearing housing may be provided as an open, semi closed or closed structure. In its most simplified form, the bearing housing may comprise two oppositely arranged frame structures for accommodation of the axle support structure. The frame structures may also have a bottom structure arranged with an opening configured for lifting and lowering at least a portion of the wheel element through the opening.

The rolling device further comprises locking means that are operable between an unlocked position allowing the rotation of the axle support members relative to the bearing housing, and a locking position preventing the rotation of the axle support members relative the bearing housing.

The wheel axle arranged for carrying the wheel element extends in between the axle support members. Each of the end portions of the wheel axle is connected (indirectly or directly) to each axle support members in an eccentric position displaced (radially) off-set from the center line of the axle support members.

The center line is also the rotational axis of the axle support members. As such the rotational axis of the wheel element is displaced in parallel from the rotational axis of the axle support members.

The axle support members are arranged for supporting each of the two end portions of the wheel axle, and may typically be provided as two separate axle support members, where the rotation of each of the axle support members may occur independently or coordinated with each other. The axle support members may alternatively be arranged in a common arrangement as being part of the same entity or component, and may then appear as a wheel axle support arrangement comprising axle support members.

A drive motor is arranged for rotation of the wheel element about the wheel axle. The drive motor arranged with a first motor part and a second motor part for conduction of relative rotation between the wheel and the wheel axle. The drive motor typically comprise a first motor part connected to the wheel axle and a second motor part connected to the wheel element for rotation of the wheel element about the wheel axle. The first motor part may be a stator and the second motor part may be a rotor or vice versa. The drive motor could be a so-called hub motor.

The locking means in the unlocked position allow the rotation of the axle support members and wheel axis relative to the bearing housing. The motor then conduct rotation of the axle support members and wheel axis relative (these are connected in a fixed manner and move as an entity) to the bearing housing for displacement of the wheel element by an eccentric movement between an extended position where at least a portion of the wheel element projects outside the bearing housing and a retracted position where the wheel element is located inside the bearing housing.

The locking means in the locking position, prevent rotation between the axle support members and the housing, the motor then rotates the wheel element for movement of the rolling device along the surface The rolling device could be said to have different operations or working modes such as a driving mode and a projection/retraction mode.

In the driving mode, the locking means are arranged in the locking position and the motor then rotates the wheel element for movement along the surface.

In a projection/retraction mode of the rolling device the locking means are in the unlocked position and the motor displaces the wheel element by an eccentric movement between an extended position where at least a portion of the wheel element projects outside the housing and a retracted position where the wheel element is located inside the housing.

For effectuation of the retraction of the wheel element, the rolling device should be kept in standstill. The friction/weight on the wheel element ensures that the rolling device is kept standstill for instance driving the device against some sort of obstacle (for instance a wall), or if the rolling device is part of a set of rolling devices the wheel elements may be rotated in opposite direction to ensure standstill. Another option is to provide counterweight/counterforce means for opposing the rotation of the wheel element when about to start the retraction of the wheel element from extended position.

The wheel element needs to be in the extended position for the motor to rotate the wheel element for carrying out movement along the surface.

The rolling device may be switched between these operation modes as needed. In some circumstances the rolling device may be used only in the driving mode, while in other circumstances switching may occur on a regular basis.

The switching between extended and retracted position of the wheel element is also to carried out according to need, the selection of and switching between these positions of the wheel may occur on a regular basis. It is also possible to employ the wheel element in a more or less permanent extended position if needed. In this scenario, the roller device offers the possibility of placing the wheel element in the retracted position as an option that not necessarily needs to take place.

The fixed connection between the wheel axis and the axle support member may be provided by arranging the end portion of the wheel axis in a corresponding receiving recess in an end surface of the axle support member. The receiving recess may then be positioned off-set from the center axis of the axle support member.

For controlling the rolling device, a control unit may be included into the rolling device, or located elsewhere, for controlling the operation modes of the drive motor. The control unit may be arranged for receiving control signals for operation of the rolling device, and the control unit may receive control signals for operation of the locking means between locking position and unlocked position, from a remote control, computer, cell phone or by voice-activation. Alternatively, the control signals may be received from a control button on the rolling device or in the vicinity or distant to the rolling device.

The locking means may typically comprise a locking bolt and a locking recess. The locking bolt may be accommodated in the bearing housing for instance in an accommodation recess, and may be prepared for engagement with a locking recess in the axle support member when in locking position, and disengaged from the locking recess in unlocked position.

At least a portion of the locking bolt may be inserted into the locking recess when in the locking position, and in the unlocked position, the locking bolt may be fully withdrawn into the accommodation recess. Other feasible solutions for locking means capable of alternating between a situation where the axle support members is free to rotate and a situation where rotation is prevented include magnetic locking devices, various mechanical locking devices etc.

In order to ensure that the locking bolt is kept in the locking position, a spring element may be arranged providing a holding force for engaging the locking bolt with the locking recess in the locking position. The spring element may be arranged for pretension of the locking bolt to ensure that the locking bolt is correctly and fully inserted into the locking recess.

Further, the control unit may be connected to actuating means for operation of the locking bolt in between engagement with the locking recess and disengagement from the locking recess. The actuating means may comprise an electromagnetic working solenoid capable of setting up a magnetic field. The locking bolt may then have at least a part or the whole locking bolt made of a ferromagnetic material, and for the retraction of the locking bolt from the locking recess, the magnetic field to be initiated by the solenoid must be strong enough to overcome the spring force for moving the locking bolt away from engagement with the locking recess. When the locking bolt is to be moved into locking position, the solenoid is controlled to be switched off, thereby eliminating the magnetic field and the locking bolt is moved into locking position by the spring force.

One or both of the axle support members may comprise a protruding guide element configured for accommodation in a guide recess arranged in the bearing housing for guidance of the rotation of the axle support members relative to the bearing housing. By this arrangement a stable and reliable rotation of the axle support members relative to the bearing housing is ensured.

To obtain efficient rotation of the axle support member relative the bearing housing, each of the axle support members may typically have the configuration of a spherical disc member and the mounting openings may be arranged as a corresponding through holes with a circular cross section. Other configurations of the axle support members suitable for enabling rotation may also be chosen, for instance cylindrical shapes, various spherical or circular shapes or other shapes capable of conducting rotary motion.

In the case where one or both of the axle support members is configured as a circular disc member, the guide element may project from the circumferential surface of the circular disc member, and the corresponding guide recess may then extend in the bearing housing along a portion of the circumference of the circular disc member.

One or both of the axle support members may be received in a mounting opening in the bearing housing, wherein the mounting opening then may be defined by an internal surrounding wall configured in the bearing housing.

Figure 1:
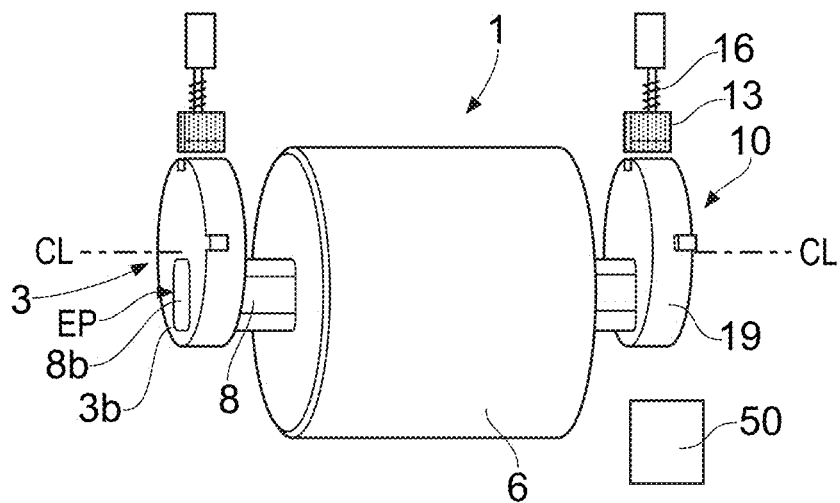
FIG. 1 is a schematic perspective view of the rolling device in accordance with the invention.
Figure 7:
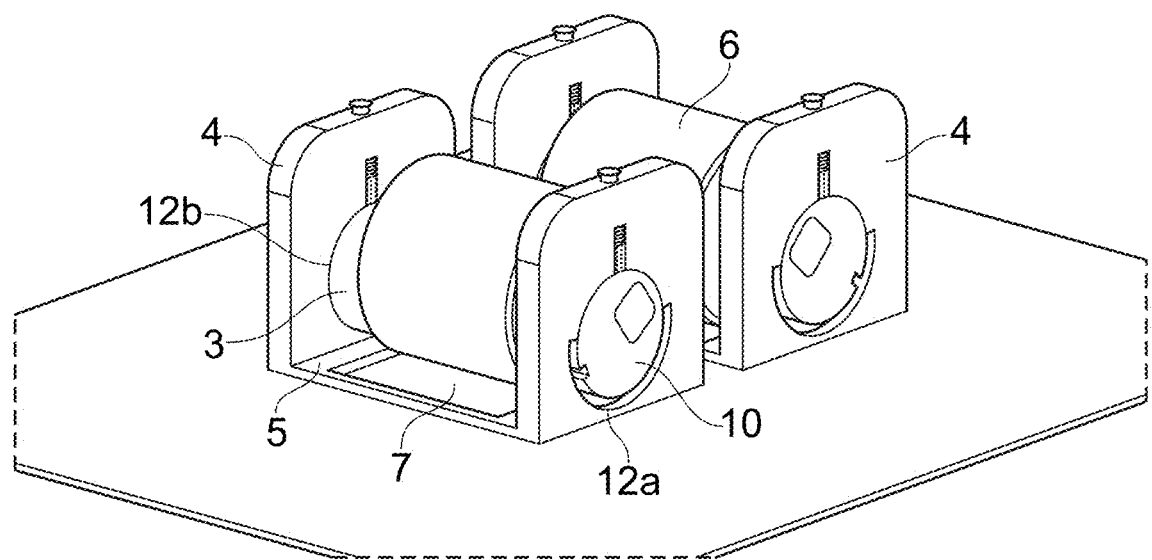
FIG. 7 is a schematic perspective view of the two rolling devices of FIG. 2-6.

A rolling device 1 for mounting or integration into a device to be moved such as furniture, euro pallets or other movable structures is shown in FIGS. 1 and 7. The rolling device 1 has a housing 2 shown in figs as a semi closed structure having two opposite frame structures here configured as side walls 4 for accommodation of the axle support members 3. A bottom structure 5 is arranged with an opening 7 configured for lifting and lowering at least a portion of the wheel element 6 through the opening 7.

The wheel element 6 is rotatably arranged on a wheel axle 8 and a drive motor (not shown) is arranged within the wheel for rotation of the wheel element 6 about the wheel axle 8. The drive motor may be a so-called hub motor or any other motor capable of rotating the wheel element 6 relative to the wheel axle 8. The drive motor typically has a first motor part connected to the wheel axle 8 and a second motor part connected to the wheel element 6 for causing relative rotation between the wheel element 6 and the wheel axle 8 upon actuation of the drive motor. The first motor part may be a stator and the second motor part may be a rotor or vice versa.

The wheel axle 8 has end portions 8a, 8b each inserted into receiving recesses 3a, 3b in the axle support members 3, 10 thereby forming a fixed connection between the wheel axle 8 and the axle support members 3, 10. The end portions 8a, 8b is connected to each axle support members in an eccentric position EP displaced offset from the center line CL of the axle support members 3, 10. The center line CL is also the rotational axis of the axle support members 3, 10.

As such the rotational axis of the wheel element is displaced in parallel from the rotational axis of the axle support members 3, 10.

The axle support members 3, 10 are each rotatably accommodated in corresponding mounting opening 12a, 12b, here shown as spherical hollows or through holes in the bearing housing 2. The axle support members 3, 10 is shown configured as circular disc members, but also other rotational bodies allowing rotation relative to the bearing housing 2 may be used in this application.

Each of the axle support members 3, 10 shown as circular disc members comprises a protruding guide element 17 that projects from the circumferential surface 19 of the circular disc member. The protruding guide element 17 is configured for accommodation in a guide recess 21 arranged in the bearing housing. The protruding guide element 17 moves in the guide recess 21 following the rotation of axle support members 3, 10 for guidance of the axle support members relative to the bearing housing.

Figure 2:
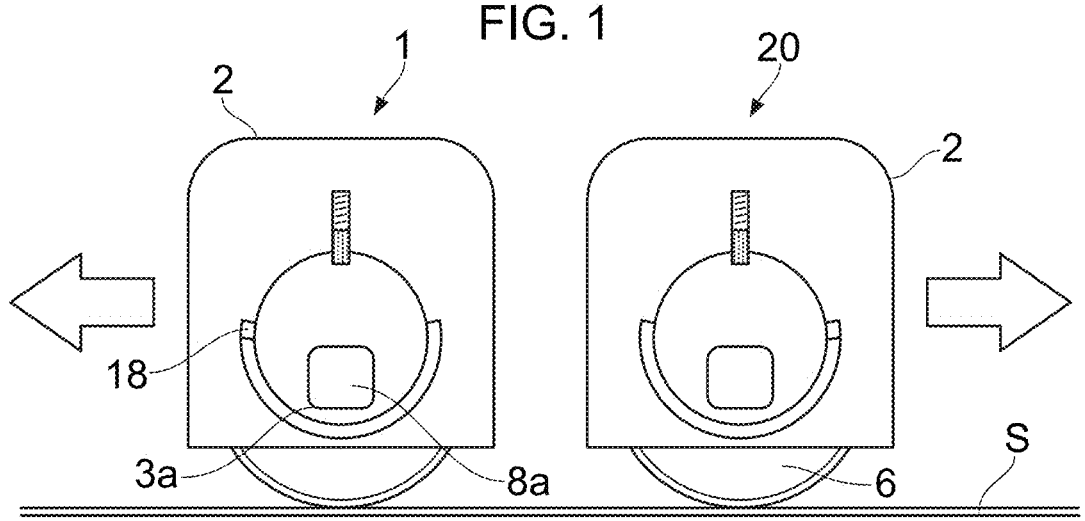
FIG. 2 is a schematic side view of pair of rolling devices in driving mode.
Figure 3:
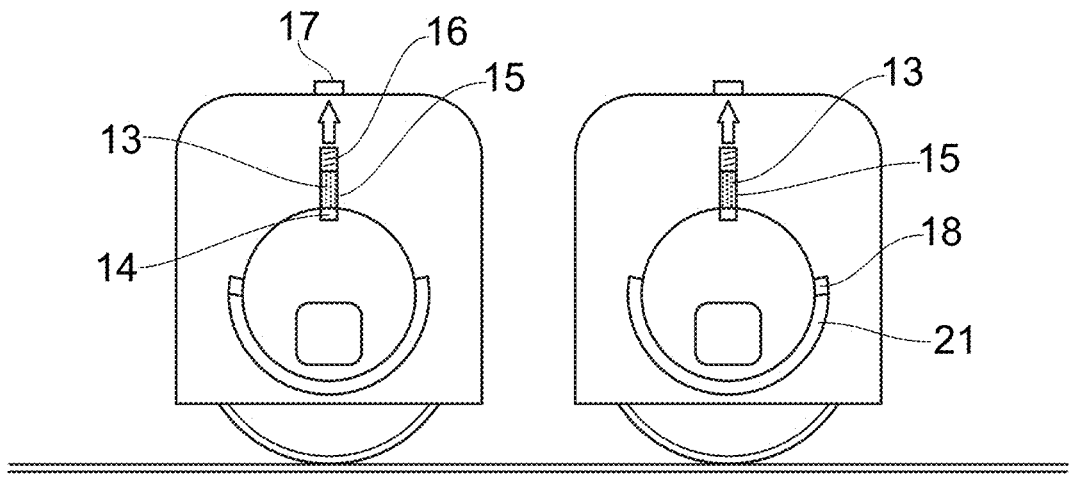
FIG. 3 shows the rolling devices of FIG. 2 beginning the retraction of the wheel element.

Locking means, which in the figures are exemplified as a locking bolt 13 arranged to be displaced into and out of a locking recess 14 in the axle support member 3, 10 are operable between an unlocked position, as illustrated in FIG. 3, and a locked position, as illustrated in FIG. 2. In the locked position as illustrated FIG. 2, the rotation of the axle support members 3, 10 relative to the bearing housing 2, is prevented and the rolling device is then in driving mode. A portion of the wheel element 6 project outside the housing and the drive motor enables the rotation of the wheel element 6 for moving the rolling device along a surface S.

Figure 4:
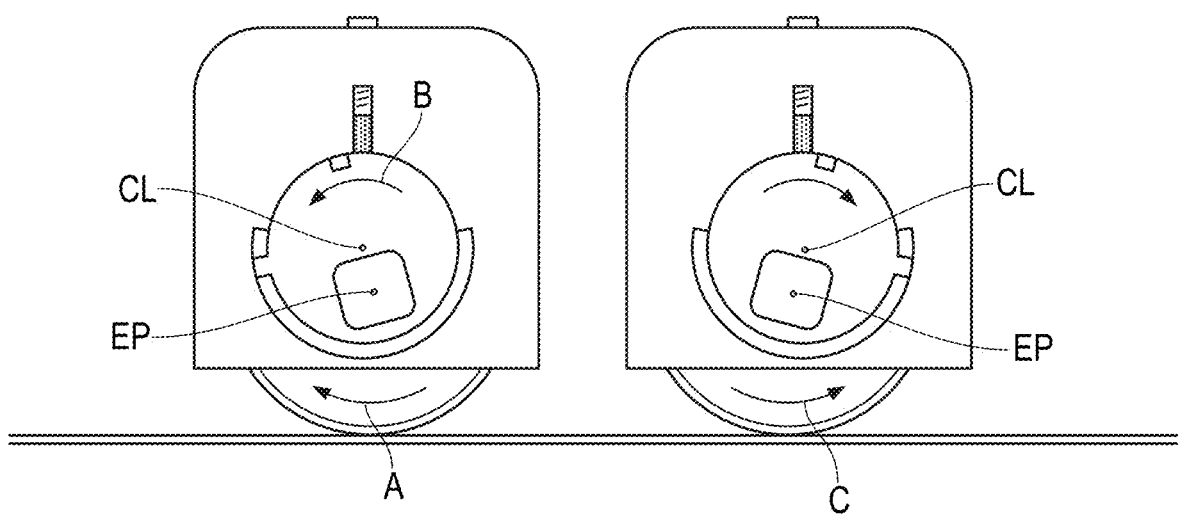
FIG. 4-5 shows the continued retraction of the wheel element.

The locking bolt 13 is arranged in an accommodating recess 15 in the bearing housing 2 and is pretensioned by a spring element 16 providing a holding force for keeping the locking bolt 13 in locked position in the locking recess 14. Actuating means 17 such as a solenoid (shown in the figs) or an electro motor (not shown in the figs) is provided for the disengagement of the locking bolt 13 from the locking recess 14, thereby obtaining an unlocked position. In the unlocked position the axle support members 3, 10 are allowed to rotate relative to the bearing housing 2, and the rolling device is arranged in a projection/retraction mode. When the drive motor rotates the wheel element 6 relative the wheel axle 8, the wheel axle 8 and the axle support members 3, 10 are free to move as an entity due to the release of the locking bolt 13 from the locking recess 14. The axle support members 3, 10 will rotate counter wise to the rotational movement of the wheel element 6, as illustrated by arrows A and B. The eccentric position of the wheel axle 8 causes the wheel element 6 to be displaced by an eccentric movement from an extended position where at least a portion of the wheel element projects outside the housing, as illustrated in FIGS. 3 and 4, and a retracted position where the wheel element is located inside the bearing housing 2 and the bearing housing 2 rests against the surface S.

A control unit 50 is provided for control of the rolling device. The control unit 20-50 receives control signals for operation of the locking means between locking position and unlocked position, from a remote control, computer, cell phone or by voice-activation.

Figure 6:
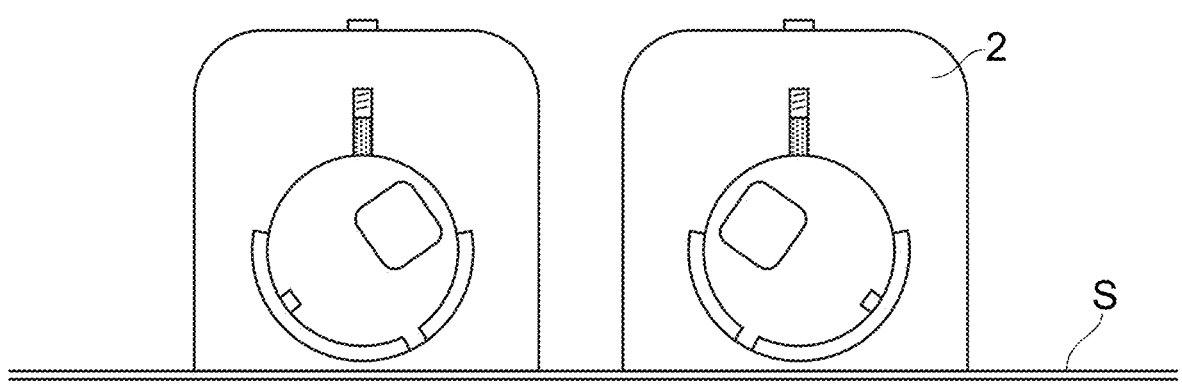
FIG. 6 shows the wheel element retracted from the surface.

If the wheel element 6 is to be displaced from the retracted position, for instance as shown in FIG. 6, to the extended position, the drive motor will be operated for rotation of the wheel element 6 in the direction opposite to the direction that caused the retraction of the wheel element 6.

Figure 5:
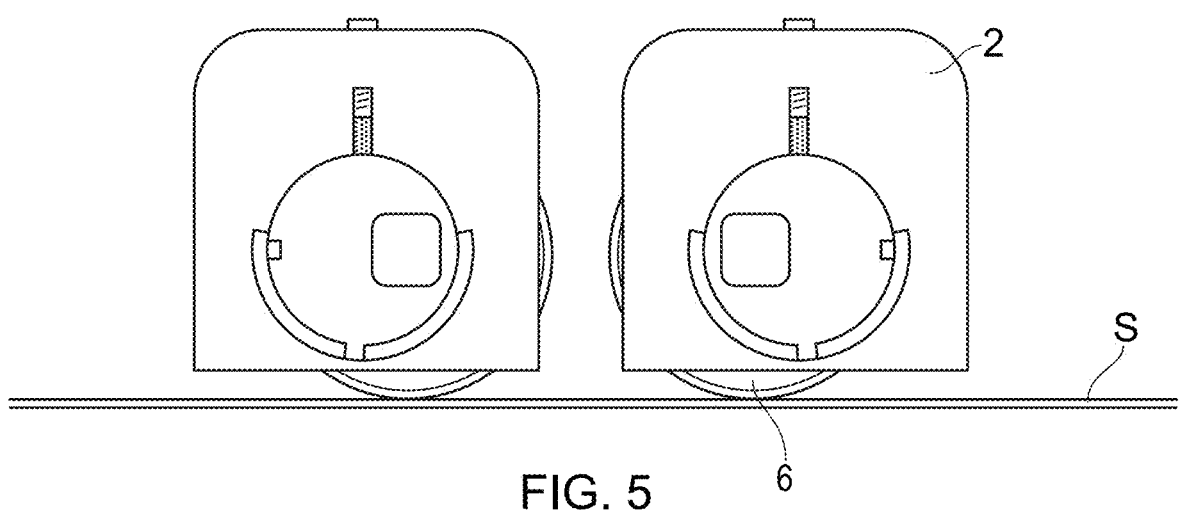

The axle support members 3, 10 could also be provided with an additional locking recess (not shown) for locking the axle support members 3, 10 when the wheel element 6 is retracted as illustrated in FIGS. 5 and 6.

In FIGS. 2-6 two rolling devices 1, 20 are shown. These may for instance be part of a set of wheels as mounted to a device to be moved, for instance a euro pallet. When the locking bolts 13 are released from the locking recesses 14, the wheel elements 6 of the two rolling devices 1, 20 are rotated in opposite directions as illustrated by arrows B and C, to minimize the rotation of the wheel element 6 and enhance the rotation of the of the wheel axle 8 and the axle support members 3, 10 to ensure efficient retraction of the wheel element 6 into the housing. As such the friction/weight on the wheel element ensures that the rolling device is kept standstill during the retraction of the wheel element 6. Other ways to effectuate resting of the rolling device while the wheel element is in extended position and about to be retracted, might include driving the device to be moved against a wall or other obstacles or to provide counterweight means for countering the rotation of the wheel element 6.

The invention claimed is:

1. A rolling device for a device to enable the moving of the device along a surface, wherein the rolling device comprises:
   a bearing housing for accommodation of a wheel axle carrying a wheel element,
   axle support members rotatably accommodated in the bearing housing, wherein each axle support member supports an end portion of the wheel axle,
   the wheel axle carrying the wheel element extends in between the axle support members, with each of the end portions of the wheel axle connected to each axle support members in an eccentric position displaced off-set from the center line of the axle support members,
   a locking assembly operable between an unlocked position allowing the rotation of the axle support members relative to the bearing housing, and a locking position preventing the rotation of the axle support members relative to the bearing housing, wherein in the unlocked position of the locking assembly, a motor conducts rotation of the axle support members and of the wheel axis relative to the bearing housing for displacement of the wheel element by an eccentric movement between an extended position where at least a portion of the wheel element projects outside the bearing housing and a retracted position where the wheel element is located inside the bearing housing.

2. The rolling device in accordance with claim 1, wherein the locking assembly in the locking position, prevent rotation between the axle support members and the bearing housing, the motor then rotates the wheel element for movement of the rolling device along the surface.

3. The rolling device in accordance with claim 1, wherein the rolling device further comprises a control unit that controls the rolling device and the control unit receives control signals for operation of the locking assembly between the locking position and the unlocked position, from a remote control, computer, cell phone or by voice-activation.

4. The rolling device in accordance with claim 1, wherein the locking assembly comprises a locking bolt accommodated in the bearing housing for engagement with a locking recess in the axle support member when in locking position, and disengaged from the locking recess in the unlocked position.

5. The rolling device in accordance with claim 4, wherein a spring element provides a holding force for engaging the locking bolt with the locking recess in the locking position.

6. The rolling device in accordance with claim 4, wherein the rolling device further comprises a control unit that controls the rolling device and the control unit is connected to an actuator for operation of the locking bolt in between engagement with the locking recess and disengagement from the locking recess.

7. The rolling device in accordance with claim 1, wherein at least one of the axle support members comprises a protruding guide element configured for accommodation in a guide recess arranged in the bearing housing for guidance of the rotation of the axle support members relative to the bearing housing.

8. The rolling device in accordance with claim 1, wherein at least one of the axle support members is received in a mounting opening in the bearing housing, wherein the mounting opening is defined by an internal surrounding wall configured in the bearing housing.

9. The rolling device in accordance with claim 8, wherein at least one of the axle support members has the configuration of a circular disc member and the mounting opening is arranged as a corresponding circular through opening.

10. The rolling device in accordance with claim 7, wherein at least one of the axle support members has the configuration of a circular disc member having a circumferential surface, the guide element projects from the circumferential surface of the circular disc member and the guide recess extends in the bearing housing along a portion of the circumference of the circular disc member.

* * * * *